May 3, 1966     W. G. BEARDEN ETAL     3,249,665

METHOD OF LINING PIPE WITH CEMENT

Filed Nov. 13, 1962

GEORGE C. HOWARD
WILLIAM G. BEARDEN
                INVENTORS

BY *William D. Miller*

ATTORNEY

United States Patent Office 3,249,665
Patented May 3, 1966

3,249,665
METHOD OF LINING PIPE WITH CEMENT
William G. Bearden and George C. Howard, Tulsa, Okla., assignors to Pan American Petroleum Corporation, Tulsa, Okla., a corporation of Delaware
Filed Nov. 13, 1962, Ser. No. 237,107
7 Claims. (Cl. 264—94)

This invention relates to the application of a protective coating to the inside of pipe. More particularly it concerns a method of placing a cement lining in pipe under pressure whereby the lining is less likely to crack when the pipe is subjected to mechanical shock or to elevated pressures during future service.

It is common practice to line steel pipe with a corrosion-resistant material to extend the life of the pipe. Plastics and resins have been used in this manner with considerable success; however, the cost of this type of lining is sometimes prohibitive. A somewhat less expensive lining is available using hydraulic cement. Owing to the thick coating of cement which must be used, this material is not satisfactory for lining small diameter lines. Its use is ordinarily limited to pipes having a diameter of at least 2 inches. Cement has the further disadvantage that it is brittle and has a low tensile strength. Cement linings may crack when they dry out or fracture when the pipe is subjected to mechanical impact, pressure surges, or high internal pressure. Additionally, the weak bond between the cement and the pipe is sometimes broken by the differential expansion of the pipe and lining produced by pressure or temperature variations. Corrosive fluids can enter cracks in the lining and attack the metal surface of the pipe.

An object of our invention is to place a cement lining in pipe in a manner such that cracks in the lining are less likely to develop. Another object is to prevent differential movement between pipe and a cement lining therein.

These and other objects are accomplished by depositing a cement slurry in the pipe, then sealing the ends thereof, then applying pressure to expand the pipe and compress the cement particles as a layer of cement having a uniform thickness is spread by centrifugal force. The pressure is maintained in the pipe until the cement has developed sufficient strength to resist compressive failure when the pressure is released. Thereafter the tension in the pipe wil resist expansion of the pipe and lining, under high fluid pressure, thereby preventing cracking or separation of the lining from the pipe.

Our invention will be described with reference to the accompanying drawings.

Figure 1:
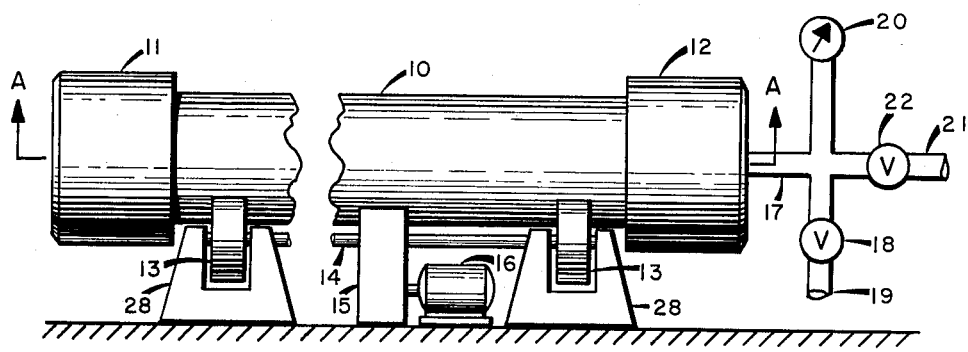
FIGURE 1 illustrates the arrangement of apparatus for carrying out our invention.

Referring to FIGURE 1 for a description of the apparatus, pipe 10 is sealed at the ends by caps 11 and 12. The pipe rests on two pairs of wheels 13 in cradles 28 so that it can be rotated by motor 16 through gear box 15 and shaft 14 which drives the wheels on one side of the cradles. This apparatus for supporting and rotating the pipe is similar to that described in U.S. Patent 2,486,420, Kennison, which has a frame with four rollers with at least one of them driven by a motor. A high pressure fluid communicates with the interior of the pipe by way of line 21 and valve 22. Gauge 20 indicates the pressure in the pipe. High pressure fluid can be vented from the apparatus through valve 18 in line 19.

Figure 2:
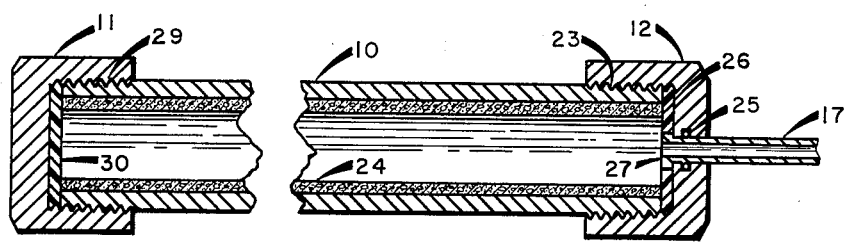
FIGURE 2 is a section at A—A in FIGURE 1 showing the details of the pipe closures at the ends of the pipe.

Details of the pipe closure at caps 11 and 12 are shown in FIGURE 2. The caps may engage the pipe by threaded connections 23 and 29 as shown. Cap 12 holds gasket 26 against the end of pipe 10 and cement lining 24 so the cement will not bond to the cap and interfere with its removal after the cement has set. Line 17 is journaled in the center of cap 12 with rotating fluid seal 25 whereby the capped pipe can be rotated about the axis of line 17. Flange 27 on the end of line 17 holds the line in the cap when the pressure is increased inside pipe 10. Cap 11 is like cap 12 with the exception that it does not have a line similar to 17 passing through the center. Plastic plate 30, similar to that in cap 12, prevents cement contact with the cap and threaded connection 29.

In lining pipe according to our invention, the internal surface of the pipe is first cleaned to remove grease, scale, and other materials which might reduce the quality of the lining. This may be accomplished by brushing, sand blasting, or the like. With the cleaned pipe lying on cradle wheels 13, a quantity of a cement slurry sufficient to line the pipe with a layer having the desired thickness is deposited in the pipe. It is desirable to distribute the cement slurry uniformly along the length of the pipe. This may be accomplished, for example, by discharging the slurry from the end of a tube as it moves through the pipe. Thereafter, the caps are attached to the ends, then the pipe is rotated at high speed by motor 16 to spread the slurry and deposit cement solids in the slurry in a uniform layer throughout.

While the slurry is being spread by the centrifugal force produced by rotation of the pipe, valve 22 is opened to admit high pressure fluid from line 21. This fluid may be either a liquid or a gas; however, a gas such as air is usually preferred over a liquid owing to the greater ease of pressure control. Also, liquids may affect the setting characteristics or strength of the cement. Steam is a desirable pressure fluid since the elevated temperature accelerates the setting of the cement, reducing the time required to line the pipe. The pressure employed should not exceed that which is calculated to produce a stress in the pipe equal to 75–80 percent of its yield value when the casting pressure is relesaed. Rotation of the pipe is continued until the cement solids have been compacted in a layer having sufficient strength to retain its cylindrical shape without the aid of centrifugal force. The length of time to accomplish this varies with the diameter of the pipe as well as the rotational speed. Ordinarily the solids can be compacted sufficiently in a six-inch pipe by rotating a 400 r.p.m. for about two minutes. Rotation may be discontinued at this time; however, the fluid pressure must be held on the pipe until the lining has developed sufficient compressive strength to resist failure when the fluid pressure is relesaed. During this period of final curing the pipe may be set aside with the pressure fluid sealed inside so that the rotating apparatus may be used to line other sections of pipe. To accelerate the curing of the cement lining, the sealed pipe may be stored in an oven or heated room. It may be desirable to rotate the pipe sections periodically while in storage under presure to wet the lining with the water standing along the bottom of the lining. The curing time of the lining is determined on the basis of cement type, pipe wall thickness, and thickness of lining. A thick lining will resist the stress of a thin-walled pipe after a shorter curing time than a thin lining in thick-walled pipe owing to the greater stress developed and lower compressive strength in the latter situation. For example, a ½-inch thick cement lining cast in 6-inch line pipe, schedule 40, having an O.D. of 6.625 inches and 0.280-inch wall thickness, has a residual hoop stress of 1,500 pounds per square inch in the cement after the casting pressure has been released. It will be necessary to maintain fluid pressure in the pipe until the cement is near its maximum strength to avoid compressive failure, however the lining will be extremely durable in that the high hoop stress will prevent the development of cracks in the lining.

When the cement lining has cured for a sufficient length of time, the pressure may be reduced and liquids drained from the pipe through valve 18 and drain line 19. Thereafter, caps 11 and 12 are removed. Plastic plates 26 in the caps are usually removed with the caps. In case they stick to the ends of the pipe, they can be peeled from the ends with little or no difficulty. Unless the lined pipe is to be installed soon, it may be desirable to wet the lining thoroughly with water and seal the ends with inexpensive low pressure caps to keep the lining from dehydrating and cracking.

At the time the fluid pressure was released, a portion of the stresses in the pipe were transferred to the lining as both radial and longitudinal compressive forces. Additionally, the cement expands at the lower confining pressure so that the contact pressure between the pipe and lining is increased. Pipe prestressed in this manner will not expand under normal fluid pressures, causing the lining to crack and separate from the pipe.

Any of the cement compositions used to line pipe can be used in our pressure lining process. Pozzolanic additives such as blast furnace or cupola slag, silica flour, sand, etc. may be mixed with the cement to reduce shrinkage. From about 0.5 to about 1.5 parts by weight of pozzolana to 1 part of cement may be used. Ordinary Portland type cement is suitable for handling most liquids. Lumnite cement may be used when the lining will be subjected to fluids at higher temperature.

Although our invention has been described in relation to the lining of pipe having threaded ends, it should be understood that it can be used equally well with pipe having other types of ends. The caps can be modified for use with flanged-end or grooved-end pipe. Plain end pipe to be connected by welding may be capped during the lining operation with a frictional device of the type sometimes used to couple cast iron pipe. Other variations in the method of practicing our invention will be apparent to those skilled in the art. Therefore, we do not intend to limit our invention to the specific embodiments described but to the invention as recited in the appended claims.

We claim:

1. In the manufacture of cement lined pipe wherein a cement slurry is deposited in said pipe, said pipe is spun about its longitudinal axis while in a substantially horizontal position to spread cement in a substantially uniform layer around the interior of said pipe, and said cement is cured, the improved method comprising sealing the ends of said pipe, applying high fluid pressure to the inside of said pipe to expand said pipe during the spreading of said cement, maintaining said pressure in said pipe until said cement has developed sufficient strength to resist compressive failure when said fluid pressure is relieved and relieving the fluid pressure in said pipe to compressively stress said cement, whereby the tendency for said cement lining to separate from said pipe is reduced.

2. The method of claim 1 wherein said fluid pressure is applied prior to the spreading of said cement.

3. The method of claim 1 wherein said fluid pressure is provided by a gaseous fluid introduced into the interior of said pipe.

4. The method of claim 3 wherein said gaseous fluid is steam.

5. The method of claim 1 wherein said cement is heated during the time said fluid pressure is maintained in said pipe and during the curing of said cement.

6. The method of claim 1 wherein said fluid pressure does not stress said pipe to more than about 80 percent of the yield strength thereof and upon the release of said fluid pressure there results a compressive stress in said cement not greater than the compressive strength of said cement at the time said fluid pressure is relieved.

7. The method of claim 1 wherein said spinning is discontinued while said fluid pressure is maintained in said pipe and said pipe is then rotated periodically during the time preceding relieving said fluid pressure.

References Cited by the Examiner

UNITED STATES PATENTS

| | | | |
|---|---|---|---|
| 1,573,568 | 2/1926 | Nichols | 264—311 |
| 2,557,554 | 6/1951 | Kennison | 264—270 |
| 2,608,501 | 8/1952 | Kimble | 264—94 |
| 2,999,780 | 9/1961 | Perrault | 264—311 |

ROBERT F. WHITE, *Primary Examiner.*

ALEXANDER H. BRODMERKEL, *Examiner.*

J. R. DUNCAN and L. S. SQUIRES,
*Assistant Examiners.*